United States Patent [19]

Gunderson

[11] Patent Number: 5,743,702
[45] Date of Patent: Apr. 28, 1998

[54] METHOD AND APPARATUS FOR A VEHICLE MOUNTED HOISTING SYSTEM

[76] Inventor: Michael J. Gunderson, 111 Herlou Dr., Selah, Wash. 98942

[21] Appl. No.: 642,452

[22] Filed: May 3, 1996

[51] Int. Cl.⁶ ............................................. B60P 1/54
[52] U.S. Cl. ................ 414/542; 414/786; 414/540; 414/460; 296/3; 224/403
[58] Field of Search ............................. 414/539, 540, 414/541, 542, 543, 544, 786, 462, 459, 460, 461; 212/344, 345, 325; 224/402, 403; 254/4 R, 2 R; 296/3

[56] References Cited

U.S. PATENT DOCUMENTS

| | | | |
|---|---|---|---|
| 2,778,512 | 1/1957 | Strona | 414/542 |
| 3,006,486 | 10/1961 | Cook et al. | 414/542 |
| 3,899,089 | 8/1975 | Wardlaw . | |
| 4,187,048 | 2/1980 | Bohlmann | 414/542 |
| 4,239,440 | 12/1980 | James | 414/542 |
| 4,249,853 | 2/1981 | Lyvers | 414/543 |
| 4,297,071 | 10/1981 | Dunbar | 414/542 |
| 4,383,791 | 5/1983 | King | 414/542 |
| 4,930,970 | 6/1990 | Sunderland | 414/542 |
| 5,028,198 | 7/1991 | Buhr | 414/542 |
| 5,037,152 | 8/1991 | Hendricks | 296/3 |
| 5,238,280 | 8/1993 | Christensen | 296/3 |
| 5,338,147 | 8/1994 | Kucharezyk et al. | 414/542 |
| 5,429,253 | 7/1995 | McNett | 212/253 |

FOREIGN PATENT DOCUMENTS

| | | | |
|---|---|---|---|
| 3307640 | 9/1984 | Germany | 414/542 |
| 292423 | 8/1991 | Germany | 414/542 |
| 4216709 | 11/1993 | Germany | 414/542 |
| 500942 | 11/1954 | Italy | 414/542 |
| 969644 | 10/1982 | U.S.S.R. | 414/540 |
| 2105294 | 3/1983 | United Kingdom | 414/542 |
| 2202510 | 9/1988 | United Kingdom | 414/542 |

OTHER PUBLICATIONS

WCCO Pic–Up Hoist System: "The Pic–Up Hoist turns everything into a one–man job . . . even 750 pound loads" advertising flyer.

*Primary Examiner*—Frank E. Werner
*Attorney, Agent, or Firm*—Stratton Ballew PLLC

[57] ABSTRACT

A method and apparatus for a hoist system for a vehicle is provided. The hoist system includes a support frame mounted to the vehicle. A slidably extendable pair of parallel rails are mounted to the support frame. The front ends and the tail ends of the parallel rails can be connected. A crossbeam that supports a hoist mechanism is slidably suspended from the pair of rails. The support frame can be collapsibly hinged for transport. The support frame is mounted to the vehicle, at a height above the cab of the vehicle or alternatively incorporated into the ladder rack of the vehicle. The hoist system is light-in-weight with a versatile support frame that can transfer heavy and swinging or shifting loads. The hoist system is also heavy-duty and has an extended and side-to-side reach.

14 Claims, 6 Drawing Sheets

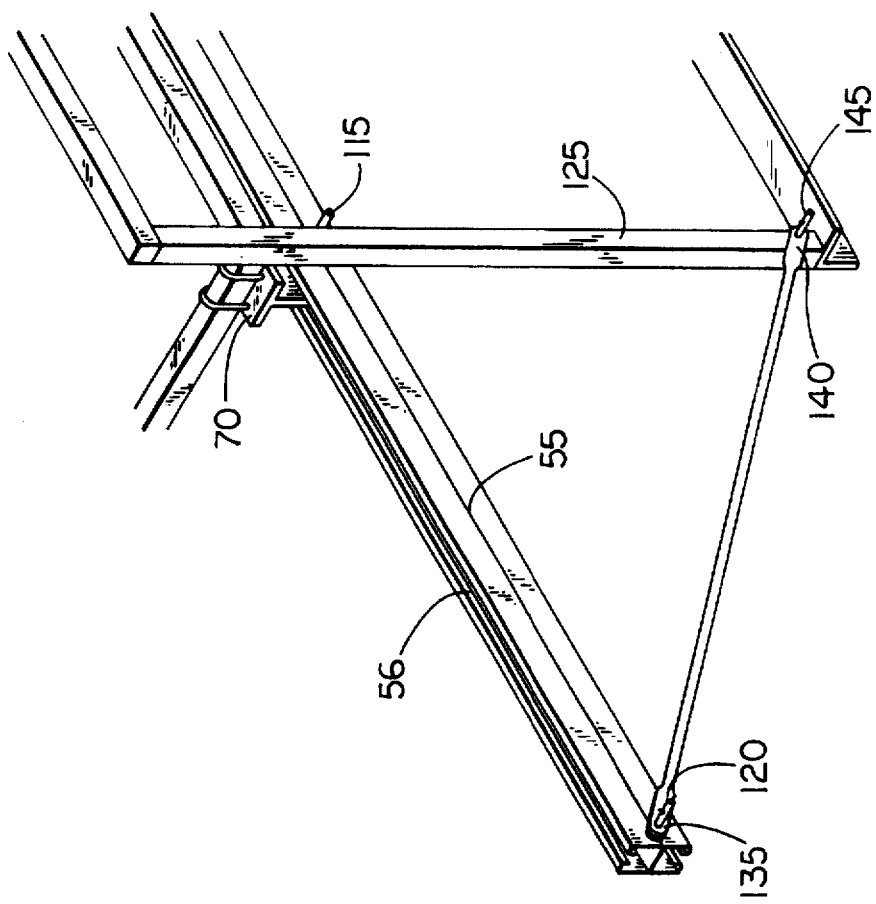

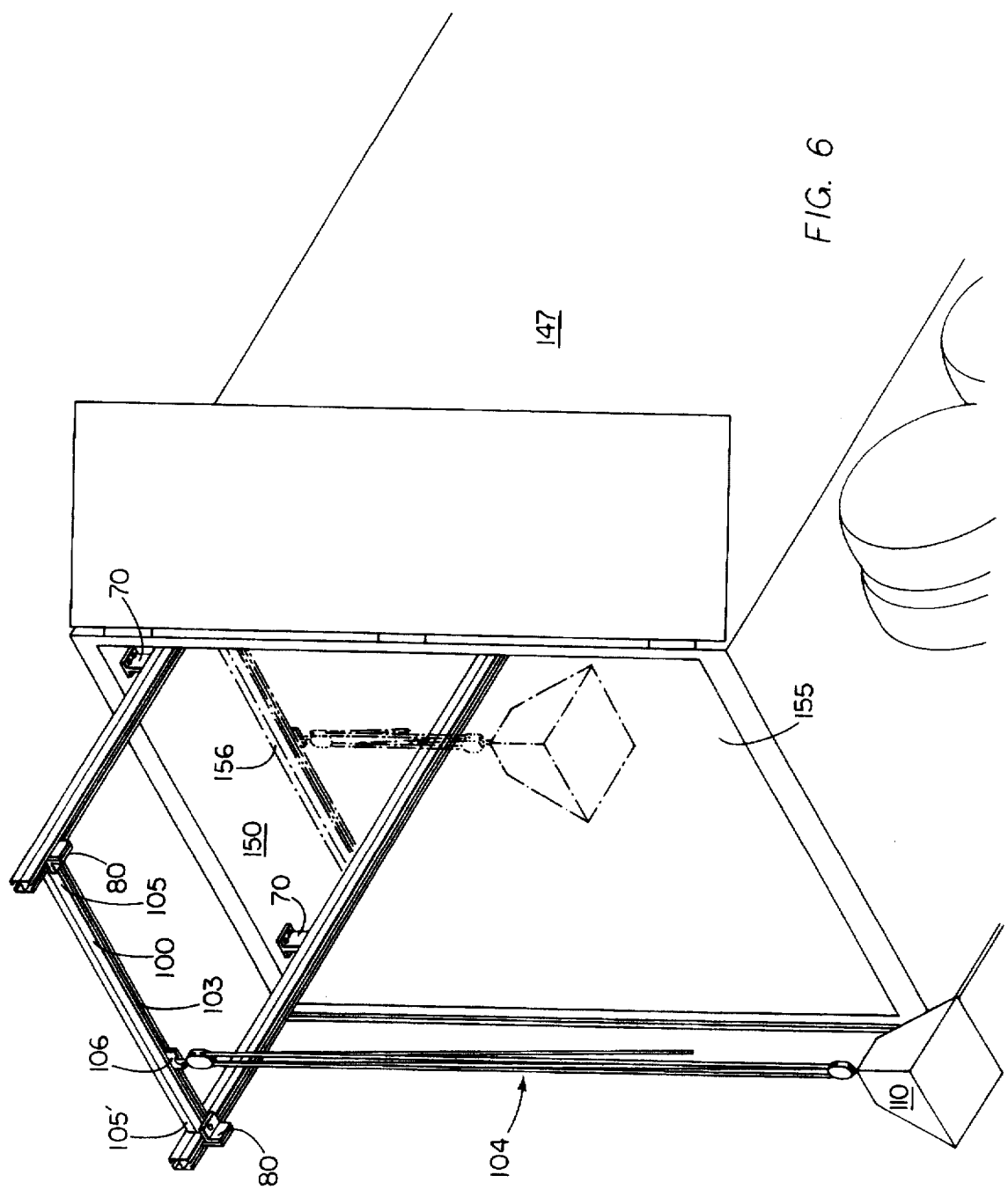

METHOD AND APPARATUS FOR A VEHICLE MOUNTED HOISTING SYSTEM

TECHNICAL FIELD

The invention relates to a method and apparatus for a vehicle mounted hoisting system, and more particularly to an extendable hoisting system that includes a mobile cross member suspended between a pair of mobile rails. The rails are mounted at or above the height of the roof of the cab of a truck, trailer or van, or incorporated into a vehicle's ladder rack.

BACKGROUND OF THE INVENTION

The transfer of heavy or bulky loads into and out of vehicles such as trucks or vans is traditionally accomplished by cranes and booms. Cranes and booms can be expensive to use in some situations. Further, cranes and booms are very large and cumbersome for use in light industrial applications. The light trucks and vans now employed for light industrial purposes, can not be equipped with heavy duty cranes and booms.

These light trucks and vans serve in light industrial situations primarily because of economic considerations. Smaller, lightweight vehicles are less expensive to own or lease, operate and maintain. Additionally, pick-up trucks and vans can also travel more quickly and agilely on congested freeways than their larger truck and trailer counterparts, an important consideration in inter-city transportation. The tradeoff for the speed of a light weight vehicle and the economical benefits of downsizing is utility. Small, lightweight vehicles equipped with traditional light weight hoisting systems are simply unable to perform the lifts achieved by their heavier duty counterparts. Therefore, a need exists for a light weight hoisting system better able to transport heavy and cumbersome loads.

Lighter weight mechanisms are available for transferring loads into and out of vehicles. Lighter weight loading mechanisms offer savings in manpower and provide independence from forklifts and external cranes. Prior lighter weight mechanisms for transferring loads into and out of vehicles include a U.S. Pat. No. 4,187,048 to Bohlmann. The Bohlmann patent shows a sliding beam apparatus for a van, supported by a U-shaped framework at the back end of the vehicle and a post located toward the front end of the vehicle. The top of the post has a sleeve for receiving a sliding beam. The sliding beam is equipped with a winch that also slides along the beam. The beam slides out of the van to lift an object with the winch, then retracts into the van for transit. However, the winch only slides along the length of the beam, running approximately the length of the vehicle, but not side-to-side. The Bohlmann apparatus is "heavy-duty," in its construction and able to lift heavy loads, but also undesirably heavy-in-weight and lack a full side-to-side reach that is needed in a hoist system.

The U.S. Pat. No. 4,239,440 to James describes an independent pair of telescoping booms, shown mounted on top of the sides of a truck's bed. Each boom contains a winch mechanism for lifting a platform off the ground and then retracting into the truck. The operation of this apparatus requires a complex mechanism of beveled gears, pulleys and screw shafts. The James apparatus is not a simple device. The complex mechanism and the inability to bring a load completely into the truck bed renders the James apparatus impractical.

The U.S. Pat. No. 4,383,791 to King claims a lifting mechanism for a flat bed vehicle that includes an inverted U-shaped boom, which is attached to the flat bed and able to pivot in only one plane. The inverted U-shaped boom is shown to be actuated by a hydraulic cylinder at the base of each boom leg. A winch is shown at the apex of the inverted U-shaped boom. The King apparatus is light-in-weight and simple, but inherently lacks the structural strength and stability required for heavier loads, which are also likely to swing or shift during the transfer into or out of the bed of the vehicle.

The truck bed hoist described in the U.S. Pat. No. 5,028,198 to Buhr begins with a pair of rails attached to the top of the sides of a truck's bed similarly to the James apparatus, as described above. Buhr places an inverted U-shaped hoist frame on the pair of rails. The U-shaped hoist frame is equipped with a trolley for the hoist that can move from side to side on the inverted U-shaped hoist frame. The inverted U-shaped hoist frame can travel back and forth along the pair of rails. The pair of rails hinge, to extend from the front of the truck bed, out beyond the truck bed's gate. However, Buhr fails to disclose any configuration other than the inverted U-shaped hoist frame. Importantly, Buhr only teaches the mounting of rails to the top surface of the truck bed sidewalls, to the floor surface, or to the interior or exterior walls of the truck bed's sidewalls. In the Buhr apparatus, the load is suspended from a "top crossbar" that is incorporated into the inverted U-shaped frame. The U-shaped frame, in turn, is inconveniently supported from a pair of "tracks" mounted to the truck bed, far below. The load in the Buhr apparatus must move along the pair of tracks while suspended from the inverted U-shaped frame. This requires the entire inverted U-shaped frame to travel along the tracks while also supporting a full load. Though the Buhr apparatus is light-in-weight, a heavy and cumbersome load that swings or shifts while being transferred with the Buhr apparatus makes the inverted U-shaped frame unstable. Therefore, a need exists for a light-in-weight hoisting system that transfers heavy and swinging or shifting loads.

These preceding patents fail to meet the need for a light weight hoisting system capable of transferring heavy loads. They only provide either heavy-duty hoist systems that support heavy or cumbersome loads but require heavy, awkward frames and mechanisms, or light-in-weight and versatile hoist systems that have extended reaches but lack the heavy-duty ability to handle cumbersome and heavier loads. Consequently, a simple, safe, and smoothly operating hoist system is needed that improves upon the available hoist systems by providing not only an extended and side-to-side reach, but also a heavy-duty load transferring ability, all in a light-in-weight hoist system.

SUMMARY OF INVENTION

According to the present invention a method and apparatus for a hoist system for a vehicle is provided. According to an aspect of the invention, the hoist system includes a vehicle having a support frame mounted to the vehicle. A slidably extendable pair of parallel rails are mounted to the support frame. A crossbeam that supports a hoist mechanism is slidably suspended from the pair of rails.

According to another aspect of the invention, the support frame can be collapsibly hinged for transport.

According to yet another aspect of the invention, the support frame is mounted to the vehicle, at a height above the cab of the vehicle.

According to another aspect of the invention, the support frame is alternatively incorporated into the ladder rack of the vehicle.

According to still another aspect of the invention, the parallel rails connected to each other.

According to one advantage of the invention a light-in-weight hoisting system is provided that can transfer heavy and swinging or shifting loads. The light-in-weight hoisting system of the present invention is constructed with light weight materials.

According to another advantage of the invention, a heavy-duty hoisting system is provided that also has an extended and side-to-side reach.

According to yet another advantage of the invention, a simple, safe, and smoothly operating hoist system is provided.

Additional features and advantages of the present invention are described in and will be apparent from the following detailed description. The invention will be better understood by reference to the detailed description of the presently preferred embodiments, taken together with the accompanying drawings.

BRIEF DESCRIPTION OF DRAWINGS

FIG. 5 is a perspective detail of a hoist system, according to an embodiment of this invention; and FIG. 6 is a perspective diagram of a hoist system, according to another embodiment of this invention.

DETAILED DESCRIPTION OF SPECIFIC EMBODIMENTS

Figure 1:
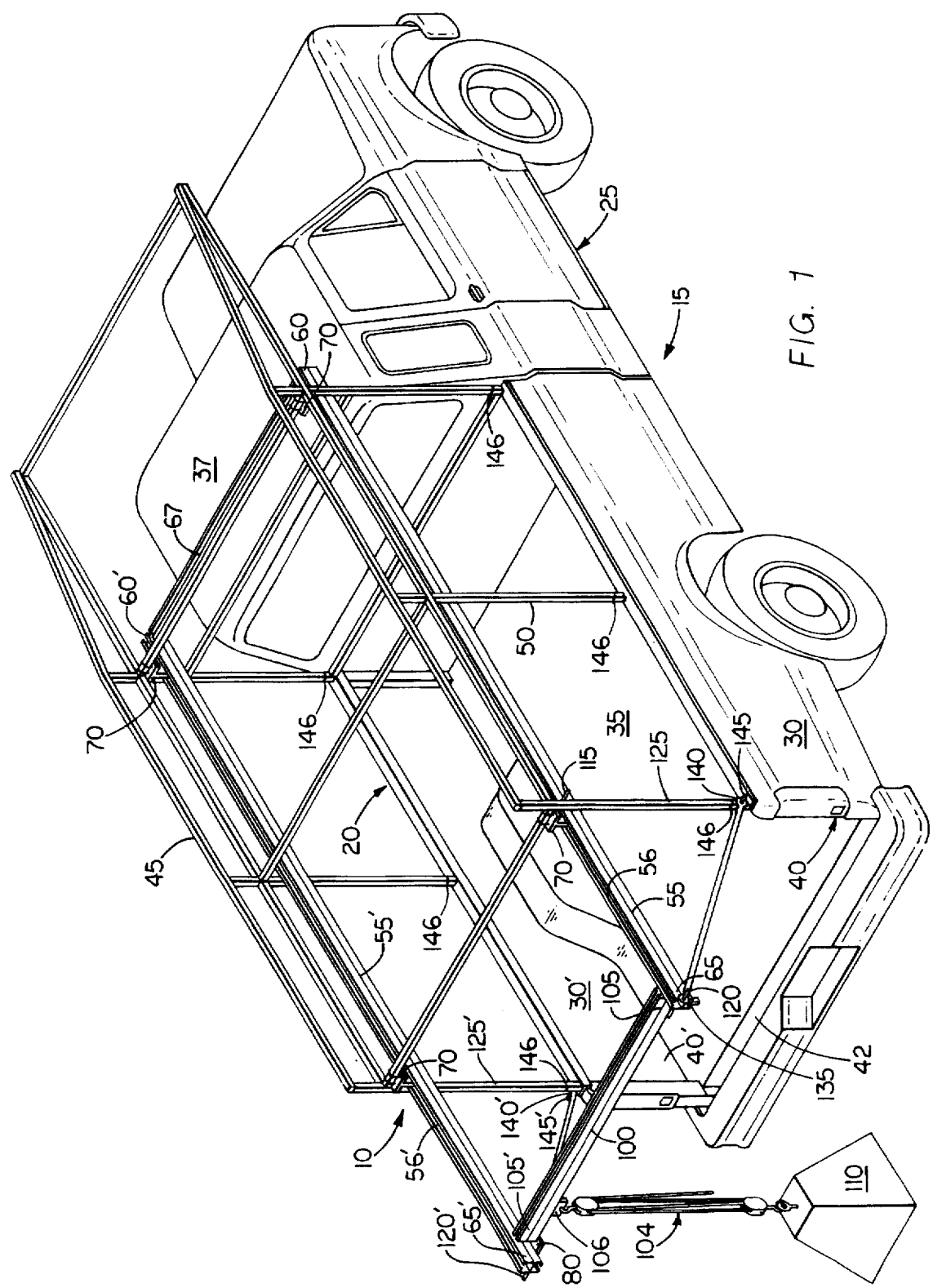
FIG. 1 is a perspective diagram of a hoist system, according to an embodiment of this invention.

The invention provides a hoist system mounted on the back of a vehicle that allows the transfer of a load into and out of the vehicle. An embodiment of the hoist system 10 is shown in FIG. 1, mounted to a vehicle of a design known as a pick-up truck 15. The standard pick-up truck includes a bed 20 attached to a cab 25. The cab has a roof 37. The bed typically includes a parallel pair of sidewalls 30 and 30', and a platform 35. The sidewalls of the bed, each have a base 40 and 40' running the length of each sidewall. The sidewalls adjoin to the platform of the bed at the base. The bed also has a back end 42 that can be fitted with a hinged tailgate (not shown).

It is typical for a pick-up truck 10 used by service personnel and contractors, to include a ladder rack 45 that is often installed above the bed 20. The ladder rack normally includes a support frame 50 vertically mounted to the pick-up truck. The support frame typically extends above the height of the roof 37 of the cab 25. The height of the support frame allows the safe transport of long items such as ladders, lengths of pipe or lumber, by allowing them to extend over the roof of the cab. Without the support frame, a long item must extend rearward, off the back end 42 of the bed, creating a potential hazard when the item is transported on a roadway.

The hoisting system 10 of the present invention includes a first rail 55 and a second rail 55', mounted in a parallel relation to each other. The first and second rails are attached to the ladder rack 45 as shown in FIG. 1. Both the first rail and the second rail have a top track 56 and 56', respectively. Without a ladder rack, the support frame can be constructed to suspend the first rail and the second rail in a parallel configuration at the desired height, the height normally occupied by the ladder rack.

The first rail 55 is mounted to the support frame 50 of the ladder rack 45, preferably above the height of the roof 37 of the cab 25. The first rail has a front end 60 and a tail end 65. The front end of the first rail is preferably placed near the cab and the tail end is preferably placed near the back end 42 of the bed 20 of the pick-up truck 15.

Like the first rail 55, the second rail 55' is also mounted to the support frame 50 at preferably the height of the roof 37 of the cab 25. The second rail is mounted in parallel relation to, the first rail. The second rail also has a front end 60' and a tail end 65'. The front end of the second rail is also preferably placed near the cab and the tail end of the second rail placed near the back end 42 of the bed 20 pick-up truck 15.

Figure 2:
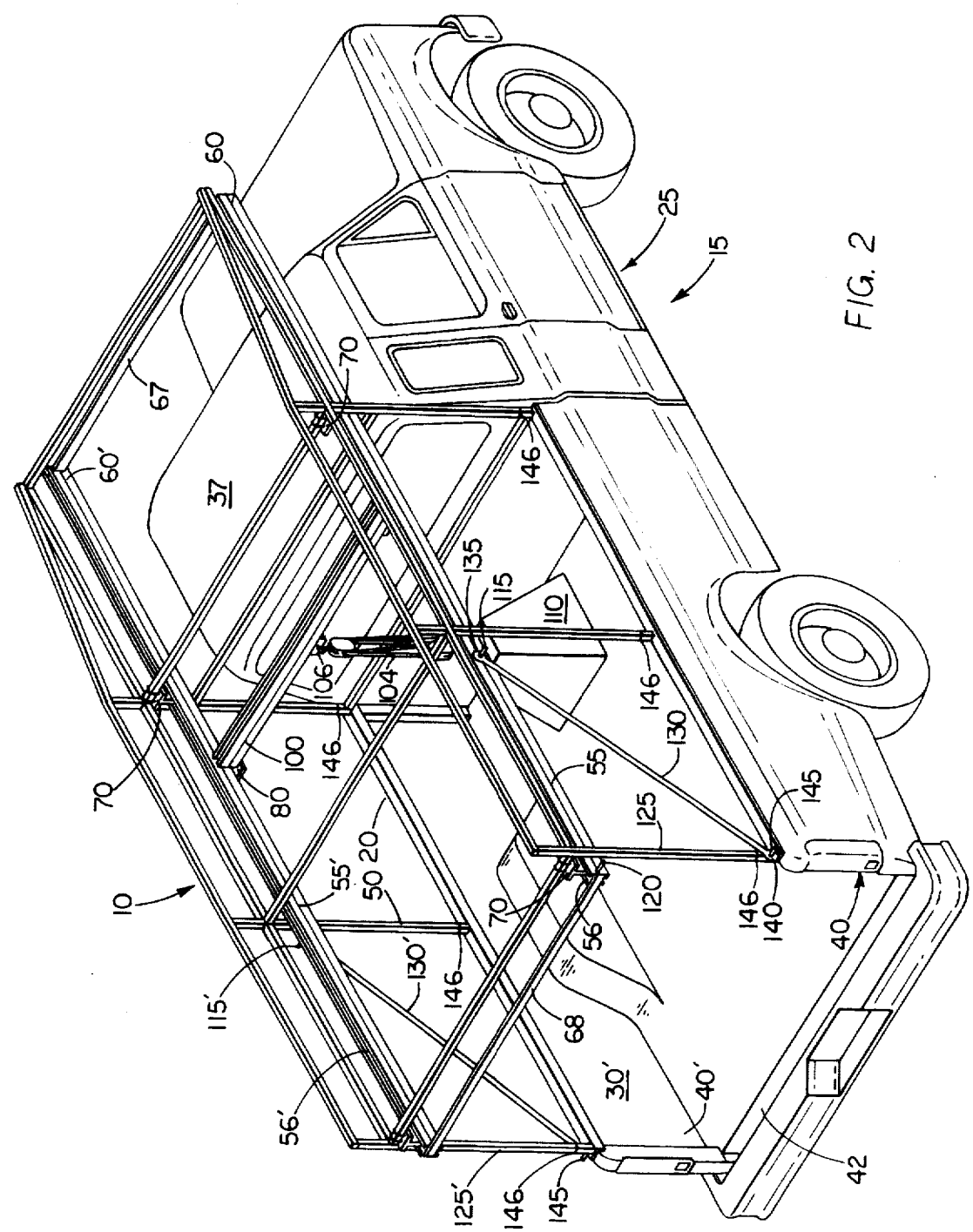
FIG. 2 is a perspective diagram of a hoist system, according to an embodiment of this invention.

The first rail 55 and the second rail 55' are together referred to herein as "the mobile rails." The mobile rails are slidably extendable. Preferably, a front bar 67 connects the front end 60 of the first rail to the front end 60' of the second rail. Also preferably, a back bar 68 connects the tail end 65 of the first rail to the tail end 65' of the second rail. The front bar is shown in FIGS. 1 and 2. The back bar is shown in FIG. 2. For clarity and ease of illustration, the back bar is not shown in FIGS. 1 and 6. The connection of the front bar and the back bar to the mobile rails enable the mobile rails to move together as one unit.

Figure 3:
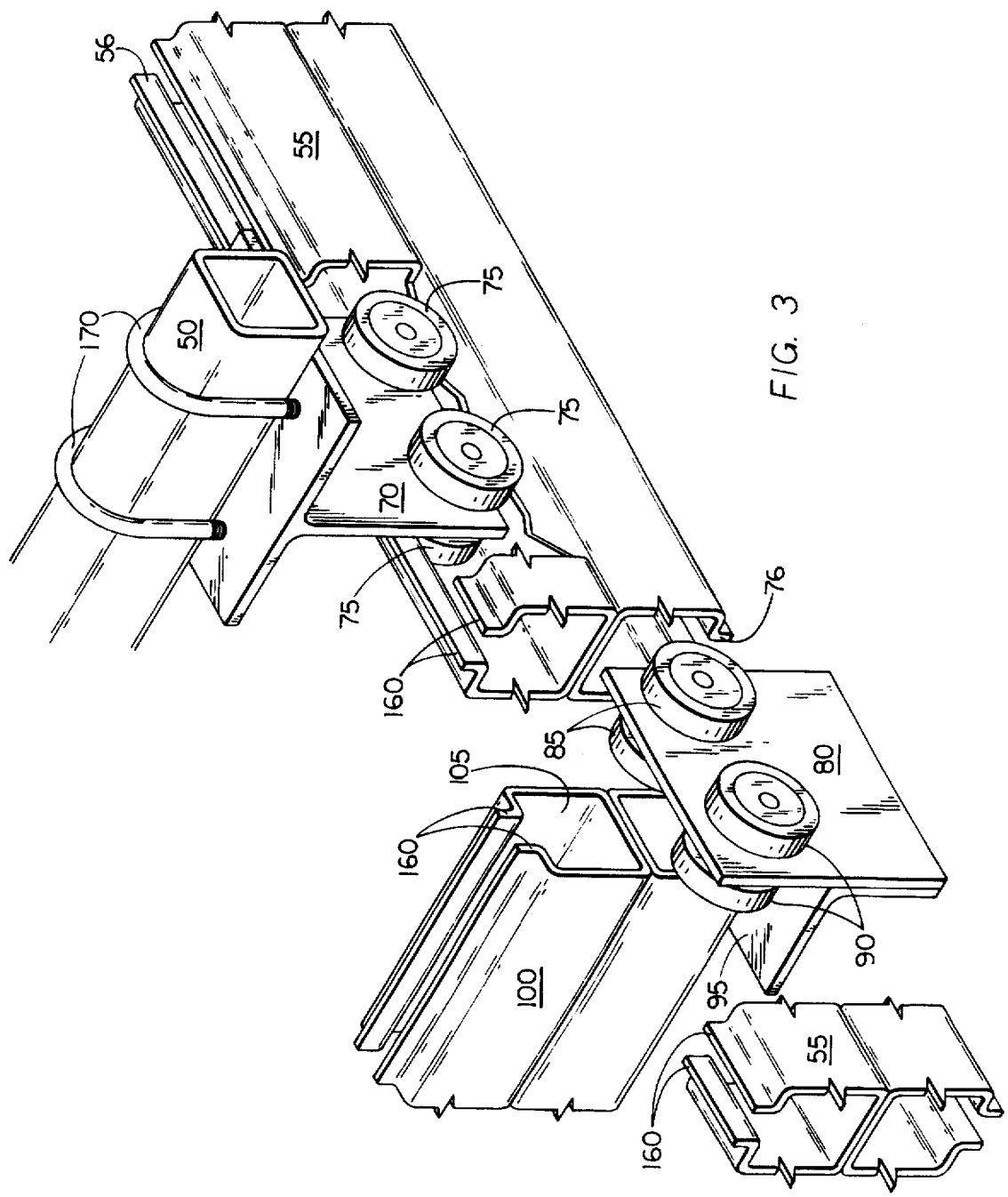
FIG. 3 is a perspective detail of a hoist system, according to an embodiment of this invention.

A minimum of two frame trolleys 70 suspend from the support frame 50 as shown in FIG. 1, 2, 4 and 5, and detailed in FIG. 3. Each frame trolley has a set of frame trolley wheels 75. The set of frame trolley wheels are receivable into the top tracks 56 and 56' of the mobile rails.

The sliding extension of the mobile rails 55 and 55' is achieved by wheeled frame trolleys 70. A minimum of two frame trolleys, mounted to the underside of the support frame 50, suspend each one of the mobile rails. The frame trolley wheels 75 of each frame trolley, roll within the top tracks 56 and 56'. The front bar 67 and back bar 68 add stability to the mobile rails and they require the mobile rails to travel in unison as suspended from the support frame by the frame trolleys. The first rail and the second rail of the mobile rails also have a lower track 76 and 76'. Preferably, the top tracks 56 and 56' and the lower tracks all run the length of the mobile rails to allow a maximal extension length for the mobile rails. Alternatively, the mobile rails could move independent of each other and not be connected by the front bar or the back bar. Also alternatively the mobile rails could be interconnected by a single bar or by multiple bars at any point along the mobile rails.

As shown in FIG. 3, each of the beam trolleys 80 hang from the lower track 76 or 76' of the mobile rails 55 and 55', respectively. The beam trolleys include a front pair of wheels 85 and a rear pair of wheels 90 that allow the beam trolleys to roll along the lower track of the mobile rails. Preferably, each beam trolley includes an L-shaped tab 95.

The first rail 55 and the second rail 55' are interconnected by a crossbeam 100. The crossbeam has a first rail end 105 and a second rail end 105'. The first rail end and the second rail end of the crossbeam are each mounted to the L-shaped tabs 95 of the beam trolleys 80 that are slidably suspended beneath the mobile rails 55 and 55', respectively. This configuration enables the crossbeam to be mobile and slidably suspended beneath the mobile rails.

The crossbeam 100 slides smoothly beneath the set of parallel mobile rails 55 and 55' from their front ends 60 and 60' to their tail ends 65 and 65'. The front bar 67 and back bar 68 prevent the crossbeam from sliding off the front ends 60 and 60' or the back ends 65 and 65' of the mobile rails. This configuration also enables the crossbeam to remain in the same position on the mobile rails, while the mobile rails are moved either toward the cab 25 or the back end 42 of the pick-up truck 15. In the preferred embodiment of the present invention, the crossbeam hangs from the mobile rails.

The crossbeam 100 also includes a bottom track 103. The bottom track of the crossbeam is located on the underside of the crossbeam and preferably runs the entire length of the crossbeam. A hoist mechanism 104 is preferably attached to the bottom track. The hoist mechanism supported and suspended from the bottom track of the crossbeam by a hoist trolley 106. The hoist trolley enables the hoist to slide from side to side on the bottom track of the crossbeam.

Preferably, the first rail 55 and the second rail 55' are separated at an adequate distance to provide stability and allow the greatest range of motion for the vehicle mounted hoist system 10. This distance of separation is preferably the distance between the sidewalls 30 and 30' of the bed 20 of the pick-up truck 15, upon which the support frame 50 is typically mounted.

The hoist mechanism 104 is preferably an electric motor driven hoist of standard design, powered by the 12 volt direct current power typically available in a pick-up truck. A powered hoist mechanism is not required. The hoist mechanism can be of a manual type such as a simple block and tackle set as shown in FIGS. 1, 2 and 6.

The crossbeam 100 remains perpendicular to the mobile rails and avoids "walking" or binding. Walking occurs when the first rail end 105 or the second rail end 105' of the crossbeam travels without the opposing end moving. Walking is avoided by separating the front pair of wheels 85 of the beam trolleys 80 from the rear wheels 90 of the beam trolleys, maintaining the crossbeam in a perpendicular orientation to the mobile rails.

To avoid walking, the height of the two mobile rails 55 and 55' is also critical. In prior hoist systems that employed parallel mobile rails, the loads were suspended from a crossbeam positioned above the mobile rails. This configuration severely limited the lifting capacity of these prior hoisting systems and especially hindered the smooth sliding of the crossbeam on the mobile rails. However, in the hoist system 10 of the present invention, a load 110 transferred by the hoist system is suspended below the mobile rails. As shown in FIGS. 1, 2, and 6, by suspending the load from the crossbeam 100, which is in turn suspended below the mobile rails, the lifting ability and range of motion of the hoist system is greatly improved. The cross beam is much more stable when suspended as compared to being supported from below. When suspended from above, the crossbeam moves smoothly from the front ends 60 and 60' to the tail ends 65 and 65' of the mobile rails, even when supporting the load.

Specifically, the truck bed hoist described in the U.S. Pat. No. 5,028,198 to Buhr teaches the mounting of a parallel set of tracks to the bed of a pick-up truck or directly to the top of the truck bed's sidewalls. The mounting of tracks in a low position is required by Buhr, to enable the parallel mounted set of rails to act as a base of support for an "inverted U-shaped frame" that then slides upon the parallel set of tracks while transferring a load. Buhr teaches away from the mounting of tracks high above the bed of the pick-up truck. Instead, the Buhr patent teaches that the stability of the inverted U-shaped frame, with its attached hoist, is increased by a low and stable mounting, firmly attached to the truck bed. The hoist system 10 of the present invention includes an elevated support frame 50 for suspending the mobile crossbeam 100 from above, instead of attempting to support the sliding inverted U-shaped frame from far below, as attempted by Buhr.

An additional measure of safety is also gained by configuring the hoist system 10 as described in the present invention. The non-moving support frame 50 offers better weight support of the load 110 than the inverted U-shaped frame described in the Buhr patent can possibly provide. If a load shifts forward or to the rear in the Buhr apparatus, the inverted U-shaped frame is predisposed to collapse. For that reason, the Buhr invention is inherently dangerous when transporting swinging or shifting loads into or out of the truck bed. In contrast, the hoist system of the present invention supports the weight of the transferred load much more evenly.

The improved design of the presently described hoist system 10 supports the weight of the load 110 directly beneath the mobile rails 55 and 55' at all times. This superior support is achieved because the load is suspended below the crossbeam 100 and the crossbeam is directly suspended from and supported by the mobile rails. The mobile rails remain in a stationary portion while the load travels on the crossbeam from side to side or front to back and likewise from back to front.

For additional safety, a pair of front stop pins 115 and 115', and a pair of rear stop pins 120 and 120' are preferably included in the hoist system 10 of the present invention, as shown in FIGS. 1, 2 and detailed in FIG. 5. The front stop pins and the rear stop pins are preferably T-lock type bolts or alternatively short lengths of bar stock. T-Lock bolts, catalog No. ST-67-T, manufactured by Bil-Jax Inc.® of Archbold, Ohio, perform adequately. Also preferably, the front stop pins mount to the mobile rails 55 and 55' at an intermediate point as illustrated in FIG. 1. Each of the front stop pins engages a rearward member 125 or 125', of the support frame 50, at the maximum backward extension of the mobile rails, off the back end 42 of the bed 20. This maximum backward extension is shown in FIGS. 1 and 3. The rear stop pins are also preferably mounted to the mobile rails at the tail ends 65 and 65' of the mobile rails, respectively. Like the front stop pins, the rear stop pins also engage the rearward member of the support frame, but at the maximum forward extension of the mobile rails. At the maximum forward extension of the mobile rails, the mobile rails extend over the roof 37 of the cab 25. This maximum forward extension is shown in FIG. 2.

Preferably, a set of support bars 130 and 130' are also used in the hoist system 10 of the present invention. The pair of support bars each have an upper pivot 135 and 135', and a lower pivot 140 and 140', respectively. The lower pivots each attach to a lower pin 145 and 145' mounted to the rearward member 125 or 125' of the support frame 50. The lower pins are preferably located on the rearward member slightly above the sidewalls 30 and 30'. This location enables the support bars to best perform as supports for the load 110 suspended from the crossbeam at the maximum rearward extension of the mobile rails 55 and 55', as shown in FIGS. 1 and 3.

Additionally, the upper pivots 135 and 135' of the support bars 130 and 130' can attach either to the front stop pins 115 and 115' or to the rear stop pins 120 and 120', respectively. When the mobile rails 55 and 55' are in the maximum rearward extension as shown in FIGS. 1 and 3, the support bars are preferably attached to the rear stop pins. In this position, the support bars support the mobile rails, prevent the mobile rails from moving forward and also aid the front stop pins 115 and 115' in preventing the mobile rails from moving further rearward.

Alternatively, when the mobile rails are positioned in the maximum forward position, the upper pivots 135 and 135' are preferably attached to the front stop pins 115 and 115'. In this position, the support bars help support the mobile rails, prevent the mobile rails from moving rearward and also aid the rear stop pins 120 and 120' in preventing the mobile rails from moving further forward.

Also alternatively, the support frame 50 of the hoist system 10 can be collapsibly hinged for transport. When equipped with hinges 146 on the support frame immediately next to the sidewalls 30 and 30' of the bed 20, the entire hoist system can collapse and rest upon the top of the sidewalls for a lower profile during transport.

The hoist system 10 can also be used in a truck, van or trailer 147 as shown in FIG. 6. The mobile rails 55 and 55' are suspended from frame trolleys 70 directly mounted to the roof interior 150 of a van or truck. The frame trolleys allow the mobile rails 55 and 55' to extend out from the truck or van. A mobile crossbeam 100 also attaches to both of the mobile rails. As described in the preferred embodiment above, the mobile crossbeam connects to the mobile rails by a set of wheeled beam trolleys 80. The mobile crossbeam also includes a hoist mechanism 104 for raising and lowering loads 110. As shown in FIG. 6, the crossbeam with the load attached to the hoist mechanism, can move along the mobile rails into the interior 155 of the trailer, to an interior position 156.

Figure 4:
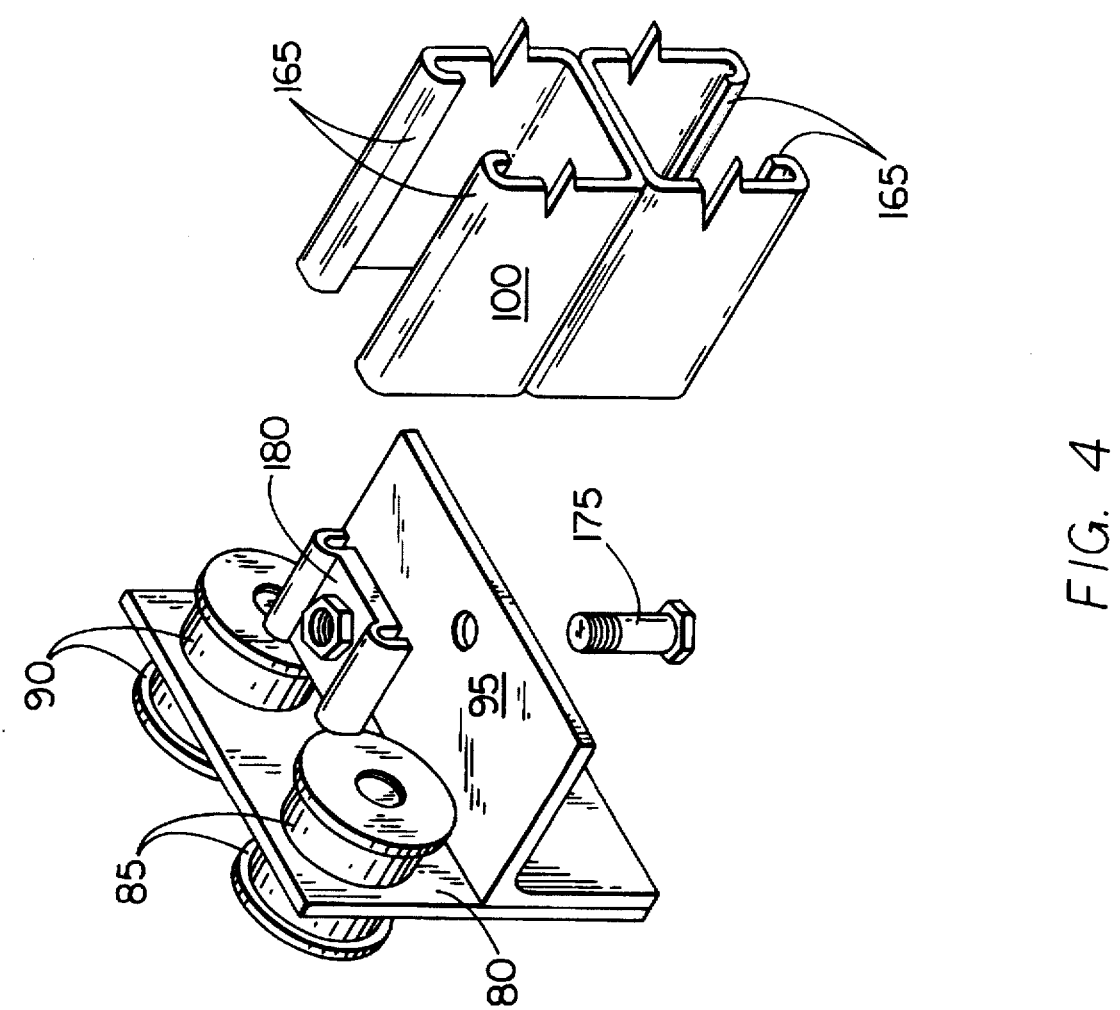
FIG. 4 is a perspective detail of a hoist system, according to an embodiment of this invention.

Another feature of the hoist system 10 of the present invention is that it can be manufactured almost entirely from currently marketed components. The mobile rails 55 and 55', and the crossbeam 100 are preferably fabricated from combinations of steel channels. Alternatively, aluminum, fiberglass or composite material could be used. As detailed in FIGS. 3 and 4, two channel lengths can be fastened together with bolts, or as preferred by welding, to form each of the mobile rails and also the crossbeam. A roll formed steel channel performs adequately. Globe Strut® steel channel, manufactured by GS Metals Corporation of Pinckneyville, Ill., Catalog No. G-3812, is preferred. FIG. 3 shows the most preferred channel configuration, with a channel having a pair of outward bent lips 160 instead of a pair of inward bent lips 165, as shown as an alternative in FIG. 4. The outward bent lips allow the frame trolleys 70 and the beam trolleys 80 to ride on a larger surface with flat faced front pair of wheels 85 and rear pair of wheels 90, as shown in FIG. 3. Alternatively, the inward bent lip configuration operates well with notched wheels as shown in FIG. 4. Also alternatively, channels without lips could be used. The inventor also conceives of using standard I-shaped beams instead of the channeled beams. I-shaped beams, though typically heavier than a similar channel beam, could be used for the mobile rails and the crossbeam.

The frame trolleys 70 and the beam trolleys 80 are also of standard design. The frame trolley wheels 75 can be either metal or plastic. Likewise, the front pair of wheels 85 and the rear pair of wheels 90 in the beam trolley can also be fabricated of plastic or metal. Catalog No. B376 Four Bearing Trolley Assemblies with flat plastic wheels, manufactured by B-Lines Systems® of Highland, Ill., are preferred. Alternatively, for use with I-shaped beams, PT020 trolley sets with angled wheels, manufactured by Ingersoll-Rand of Seattle, Wash., performs adequately.

The frame trolleys 70 are preferably retrofitted with U-bolts 170, as shown in FIG. 3, for attachment to the frame 50. The beam trolleys 80 are each retrofitted with the L-shaped tab 95, as shown in FIGS. 3 and 4. The L-shaped tab can be bolted onto the beam trolley or welded, as preferred. The first rail end 105 and the second rail end 105' of the crossbeam 100 are preferably attached to the beam trolleys with a beam bolt 175 selected to couple with a lock nut 180, specifically fabricated for use with channels. Standard/Universal Lock Nuts, Catalog No. G-1037, manufactured by GS Metals Corporation of Pinckneyville, Ill., perform adequately. Other typical locking nuts are conceived for use in the present invention.

In compliance with the statutes, the invention has been described in language more or less specific as to structural features and process steps. While this invention is susceptible to embodiment in different forms, the specification illustrates preferred embodiments of the invention with the understanding that the present disclosure is to be considered an exemplification of the principles of the invention, and the disclosure is not intended to limit the invention to the particular embodiments described. Those with ordinary skill in the art will appreciate that other embodiments and variations of the invention are possible which employ the same inventive concepts as described above. Therefore, the foregoing description should not be taken as limiting the scope of the inventions that are defined by the appended claims.

What is claimed is:

1. A hoist system for a vehicle, which includes:

a support frame mounted to the vehicle, the support frame having a first rearward member and a second rearward member, the first rearward member having a first lower pin, the second rearward member having a second lower pin;

a slidably extendable first rail mounted to the support frame, the first rail having a first front stop pin and a first rear stop pin;

a first support bar, attachable to between the first lower pin and the first rear pin;

a slidably extendable second rail mounted to the support frame, the second rail having a second front stop pin and a second rear stop pin;

a second support bar, attachable to between the second lower pin and the second rear pin;

the second rail mounted in parallel relation to the first rail;

a hoist mechanism; and a two ended mobile crossbeam for slidably supporting the hoist mechanism, the two ended mobile crossbeam having a first end slidably mounted to the first rail, and the two ended mobile crossbeam having a second end slidably mounted to the second rail, the first support bar supports the first rail and prevents sliding movement of the first rail; and the second support bar supports the first rail and prevents sliding movement of the second rail.

2. The hoist system of claim 1, wherein the first rail is connected to the second rail.

3. The hoist system of claim 1, wherein the first rail has a front end;

the second rail has a front end;

a front bar connected from the front end of the first rail to the front end of the second rail; and the front bar prevents the crossbeam from traveling past the front end of the first bar, and the front bar prevents the crossbeam from traveling past the front end of the second bar.

4. The hoist system of claim 1, wherein the first rail has a first tail end;

the second rail has a second tail end;

a back bar is connected from the first tail end to the second tail end; and the back bar prevents the crossbeam from traveling past the first tail end of the first bar and the back bar prevents the crossbeam from traveling past the second tail end of the second bar.

5. The hoist system of claim 1, wherein the vehicle includes a bed; and the support frame has hinged risers, and the hinged risers collapse for transport to a position proximate to the bed.

6. The hoist system of claim 1, wherein the vehicle has a ladder rack that includes the support frame.

7. The hoist system of claim 1, wherein the vehicle includes a roof; and the support frame being mounted to an underside of the roof.

8. A method of a transferring a load, which includes:

mounting a support frame to a vehicle;

mounting a slidably extendable first rail to the support frame;

mounting a slidably extendable second rail to the support frame, the second rail mounted in parallel relation to the first rail;

slidably attaching a mobile crossbeam to the first rail, the mobile crossbeam having a first end and a second end;

slidably attaching the second end of the mobile crossbeam to the second rail;

slidably supporting the hoist mechanism from beneath the mobile crossbeam;

lifting the load with the hoist mechanism;

providing the support frame with a first rearward member including a first lower pin and a second rearward member including a second lower pin;

attaching a first support bar, connecting the first lower pin to the first rear stop pin;

attaching a second support bar, connecting the second lower pin and the second rear stop pin;

preventing sliding movement of the first rail with the first support bar; and preventing sliding movement of the first rail with the second support bar support.

9. The method of claim 8, additionally including the steps of:

connecting a front bar from a first front end of the first rail to a second front end of the second rail, preventing the crossbeam from traveling past the first front end with the front bar; and preventing the crossbeam from traveling past the second front end with the front bar.

10. The method of claim 8, additionally including the steps of:

connecting a back bar from a first tail end of the first rail to a second tail end of the second rail;

preventing the crossbeam from traveling past the first tail end with the back bar; and preventing the crossbeam from traveling past the second tail end with the back bar.

11. The method of claim 8, additionally including the steps of:

connecting a front bar from a front end of the first rail to a front end of the second rail;

connecting a back bar from a tail end of the first rail to a tail end of the second rail; and moving the first rail and moving the second rail together as one unit.

12. The method of claim 8, additionally including the steps of:

adding hinged risers to the support frame; and collapsing the risers for transport to a position proximate a bed of the vehicle.

13. The method of claim 8, additionally including the steps of mounting the support frame to an underside of a roof of the vehicle.

14. A hoist system for a vehicle having a cab, which includes:

a support frame mounted to the vehicle, at a height above the cab of the vehicle;

a slidably extendable first rail mounted to the support frame;

a slidably extendable second rail mounted to the support frame, the second rail mounted in parallel relation to the first rail;

a slidable hoist mechanism;

a two ended mobile crossbeam for slidably supporting the hoist mechanism, the two ended mobile crossbeam having a first end slidably mounted to the first rail, and the two ended mobile crossbeam having a second end slidably mounted to the second rail;

the support frame including a first rearward member and a second rearward member;

the first rearward member has a first lower pin;

the second rearward member has a second lower pin;

the first rail has a first front stop pin and a first rear stop pin;

the second rail has a second front stop pin and a second rear stop pin;

a first support bar, attachable to between the first lower pin and the first rear stop pin;

a second support bar, attachable to between the second lower pin and the second rear stop pin;

the first support bar supports the first rail and prevents the sliding movement of the first rail; and the second support bar supports the first rail and prevents the sliding movement of the second rail.

* * * * *